United States Patent
Yu

(10) Patent No.: US 10,392,842 B1
(45) Date of Patent: Aug. 27, 2019

(54) CLAMPING ASSEMBLY FOR GLASS DOOR

(71) Applicant: SUN-Q DOOR CONTROLS LIMITED, Yuanlin (TW)

(72) Inventor: Shun-Hsien Yu, Yuanlin (TW)

(73) Assignee: SUN-Q DOOR CONTROLS LIMITED, Yuanlin, Changhua County ( * ) Notice: Subject to any disclaimer, the term of this patent is extended or adjusted under 35 U.S.C. 154(b) by 0 days.

(21) Appl. No.: 16/050,540

(22) Filed: Jul. 31, 2018

(30) Foreign Application Priority Data

Jul. 6, 2018 (TW) .............................. 107123586 A

(51) Int. Cl.
| | |
|---|---|
| *E05D 5/02* | (2006.01) |
| *F16B 2/06* | (2006.01) |
| *E06B 3/60* | (2006.01) |
| *E06B 3/263* | (2006.01) |
| *E06B 3/54* | (2006.01) |

(52) U.S. Cl.
CPC ...... *E05D 5/0246* (2013.01); *E05Y 2900/132* (2013.01); *E06B 3/5454* (2013.01); *E06B 3/60* (2013.01); *E06B 2003/26398* (2013.01); *F16B 2/065* (2013.01); *Y10T 16/534* (2015.01)

(58) Field of Classification Search
CPC ... E05D 5/0246; E05D 7/08; E05Y 2900/132; E06B 3/5454; E06B 3/60; E06B 2003/26398; F16B 2/065; A47K 3/36
USPC ................ 16/252, 382; 49/388; 4/607, 557; 403/373
See application file for complete search history.

(56) References Cited

U.S. PATENT DOCUMENTS

| | | | | |
|---|---|---|---|---|
| 4,787,120 A | * | 11/1988 | Haigh ...................... | A47K 3/36 16/317 |
| 4,977,642 A | * | 12/1990 | Marinoni .............. | E05D 5/0246 16/257 |
| 5,613,276 A | * | 3/1997 | Franz ....................... | A47K 3/36 16/229 |
| 6,643,898 B1 | * | 11/2003 | Cameron ................. | A47K 3/36 16/309 |
| 9,080,357 B1 | * | 7/2015 | Austin, III ................ | E05D 7/12 |
| 2005/0050685 A1 | * | 3/2005 | Chen ..................... | E05D 5/0246 16/332 |
| 2006/0277716 A1 | * | 12/2006 | Sprague ................... | A47K 3/36 16/252 |
| 2007/0261198 A1 | * | 11/2007 | Vogler .................. | E05D 5/0246 16/87 R |

(Continued)

FOREIGN PATENT DOCUMENTS

CN          103470151 B          1/2016

*Primary Examiner* — William L Miller
(74) *Attorney, Agent, or Firm* — Muncy, Geissler, Olds & Lowe, P.C.

(57) ABSTRACT

The clamping assembly for a glass door includes an outer clamping body, an inner clamping body, an automatic homing mechanism and a positioning unit. An upper jaw for clamping the glass door is provided on the top of the outer clamping body, and a first side wall and a second side wall are recessedly formed at the bottom of the outer clamping body. A first lower jaw is formed between the first side wall and the second side wall. The inner clamping body is disposed in the first lower jaw. A second lower jaw is formed at the bottom of the inner clamping body. The automatic homing mechanism is disposed in the second lower jaw. The positioning unit penetrates the first side wall to abut against the first recess on the inner clamping body.

8 Claims, 7 Drawing Sheets

(56) References Cited

U.S. PATENT DOCUMENTS

| | | | |
|---|---|---|---|
| 2008/0083087 A1* | 4/2008 | Lin | E05D 11/1064 16/252 |
| 2014/0352108 A1* | 12/2014 | Cheng | E05F 3/104 16/54 |
| 2015/0211272 A1* | 7/2015 | Austin, III | E05D 7/12 49/506 |
| 2016/0160544 A1* | 6/2016 | Aykas | E05D 7/00 16/378 |

* cited by examiner

CLAMPING ASSEMBLY FOR GLASS DOOR

BACKGROUND OF THE INVENTION

1. Technical Field

The present invention generally relates to an automatic homing mechanism for a glass door and, more particularly, to a clamping assembly disposed on the top or at the bottom on one side of a glass door for clamping the glass door.

2. Description of Related Art

Referring to FIG. 2 in CN103470151B, a long clip for a glass door is disclosed, including: a clip body 1 and an automatic homing mechanism 2. The clip body 1 includes an upper jaw 11 and a lower jaw 12. The upper jaw 11 is fixed under a glass door. The automatic homing mechanism 2 is disposed in the lower jaw 12. The automatic homing mechanism 2 protrudes downwards from a driving shaft being connected to the ground. Consequently, when a user opens or closes the glass door, the glass door drives the clip body 1 and the automatic homing mechanism 2 to pivot, such that the driving shaft of the automatic homing mechanism 2 drives the hydraulic assembly in the automatic homing mechanism 2 to provide an oil pressure to facilitate automatic homing of the glass door.

From the above description, it can be known that the size of the lower jaw 12 of the clip body 1 is fixed to accommodate only the automatic homing mechanism 2 of the same model. However, a glass door may be designed to have different sizes, thicknesses and weights depending on the place of use, and the model and the size of the automatic homing mechanism 2 will also be replaced to be applied to different glass doors. Accordingly, the manufacturer has to produce a clip body 1 that can be equipped with a lower jaw 12 with different sizes to have different automatic homing mechanisms 2 install therein. Therefore, the production cost is higher, which is not economic.

In summary, the conventional long clip for a glass door has some shortcomings and needs to be improved.

BRIEF SUMMARY OF THE INVENTION

Accordingly, one object of the present invention is to provide a clamping assembly for a glass door that can be applied to different types of automatic homing mechanisms, which reduces production cost and is economic.

The clamping assembly includes an outer clamping body, an inner clamping body, an automatic homing mechanism and a positioning unit. An upper jaw for clamping the glass door is recessedly provided on the top of the outer clamping body. A first side wall and a second side wall are recessedly formed spaced apart from each other at the bottom of the outer clamping body. A first lower jaw is formed between the first side wall and the second side wall. A first bump is provided transversely extending on an inner side of the first side wall. The inner clamping body disposed in the first lower jaw of the outer clamping body. A third side wall and a fourth side wall are recessedly formed spaced apart from each other at the bottom of the inner clamping body. An outer side of the third side wall and an outer side of the fourth side wall abut against the inner side of the first side wall and an inner side of the second side wall, respectively. A second lower jaw is recessedly formed between the third side wall and the fourth side wall. A first recess is provided transversely extending on the outer side of the third side wall corresponding to the first bump. A second bump is provided transversely extending on the inner side of the third side wall. The first recess corresponds to the second bump. The automatic homing mechanism is detachably disposed in the second lower jaw of the inner clamping body. A second recess is provided transversely extending on one side of the automatic homing mechanism corresponding to the second bump. The positioning unit transversely penetrates the first side wall and the first bump to abut against the first recess on the third side wall.

Preferably, a third bump is provided transversely extending on the inner side of the second side wall. A third recess is provided transversely extending on the outer side of the fourth side wall corresponding to the third bump. A fourth bump is provided transversely extending on an inner side of the fourth side wall. The third recess corresponds to the fourth bump. A fourth recess is provided transversely extending on the other side of the automatic homing mechanism corresponding to the fourth bump.

Preferably, the inner clamping body further includes a top wall connecting the third side wall and the fourth side wall. A top abutting unit is provided on the top of the automatic homing mechanism and includes a fixing plate fixedly connected to the top of the automatic homing mechanism and a top abutting member disposed on the fixing plate and abutting against the top wall of the inner clamping body.

Preferably, the outer clamping body further includes a connection wall connecting the first side wall and the second side wall. The top wall of the inner clamping body abuts against the connection wall and longitudinally penetrates a long trough. A fixing member penetrates the long trough and is separably fixed to the connection wall of the outer clamping body to position the inner clamping body on the outer clamping body.

Preferably, the long trough includes an accommodating area and an expansion area communicating with each other. The accommodating area opens upwards. The expansion area gradually expands from the inside out and opens downwards. The fixing member is a screw including a head and a thread portion being connected with each other. The head is disposed in the expansion area. The thread portion penetrates the accommodating area and is screwed to the connection wall of the outer clamping body.

Preferably, the positioning unit is a headless screw.

Preferably, the top abutting member is a headless screw and longitudinally screwed to the fixing plate to abut against the top wall of the inner clamping body.

Preferably, the clamping assembly further including a cover disposed on an outer edge of the outer clamping body.

Therefore, when the user wants to replace the automatic homing mechanism with a larger one, the larger automatic homing mechanism can be disposed on the first lower jaw of the outer clamping body by removing the inner clamping body. Then, the positioning unit transversely penetrates the first side wall and the first bump to abut against one side of the larger automatic homing mechanism to complete the installation.

As stated above, when the inner clamping body is disposed in the first lower jaw of the outer clamping body, the automatic homing mechanism with a smaller size can be installed on the second lower jaw of the inner clamping body. As long as the inner clamping body is removed, an automatic homing mechanism with a larger size can be installed on the first lower jaw of the outer clamping body, which is convenient and can reduce the production cost of the manufacturer to make it economic.

The following detailed descriptions and appended drawings are hereby referred to, such that, and through which, the purposes, features and aspects of the present invention can be thoroughly and concretely appreciated; however, the appended drawings are merely provided for reference and illustration, without any intention to be used for limiting the scope of the present invention.

DETAILED DESCRIPTION OF THE INVENTION

Figure 1:
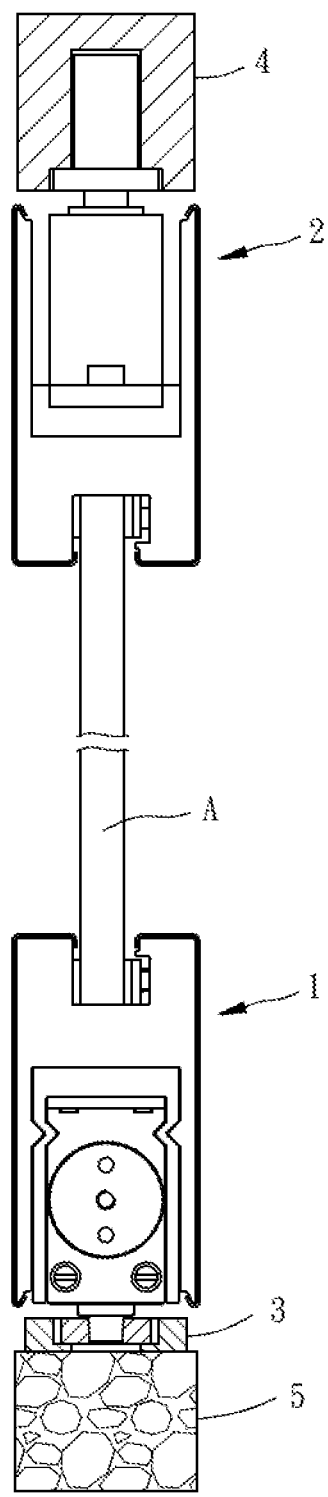
FIG. 1 is a left side view showing a glass door clamped by a clamping assembly installed on the ground according to one embodiment of the present invention.
Figure 2:
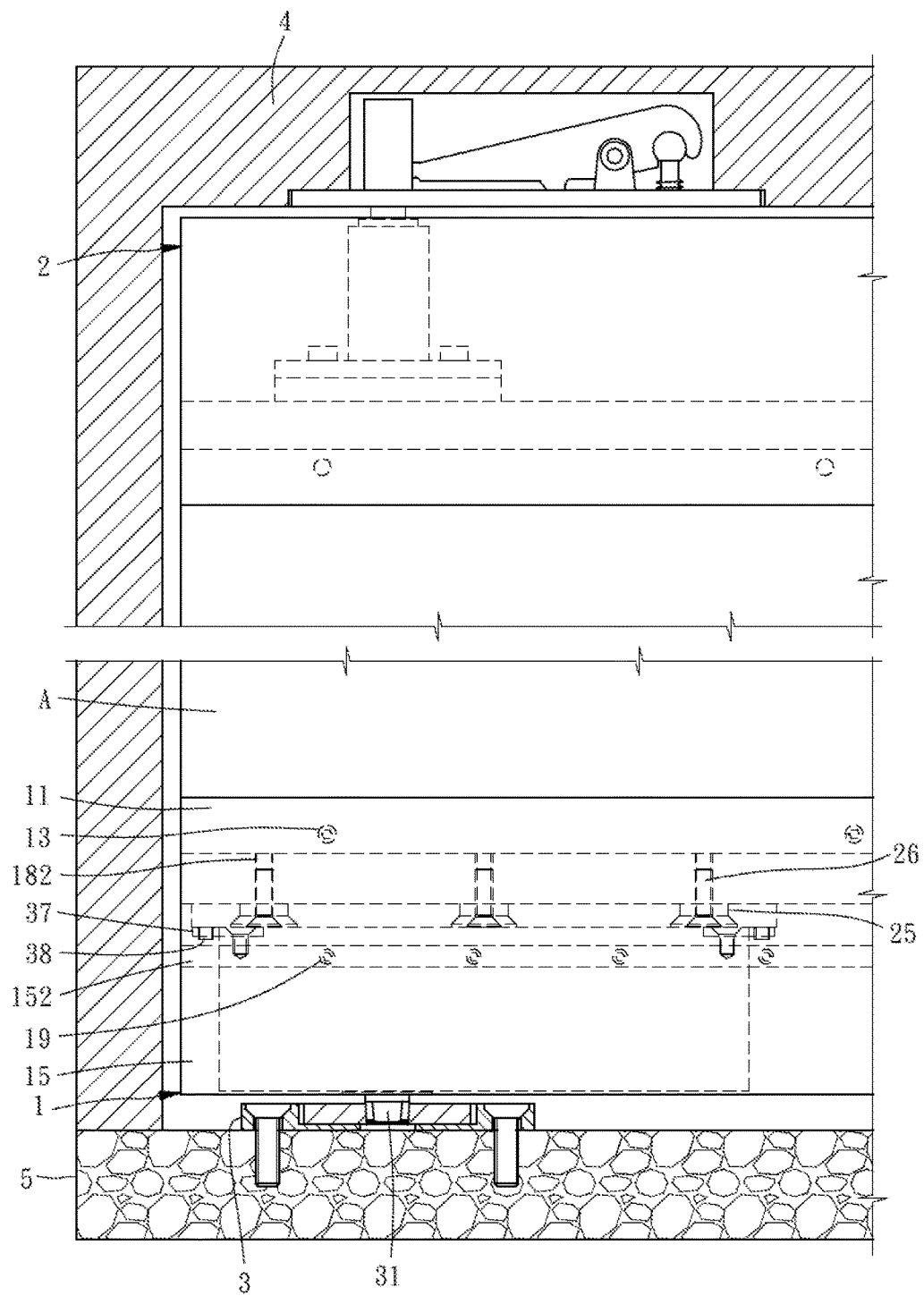
FIG. 2 is a front view according to one embodiment of the present invention.

Referring to FIG. 1 to FIG. 2, a clamping assembly 1 for a glass door according to one embodiment of the present invention is disposed under on one side of a glass door A and is connected to a plate unit 3 fixed on the floor 5. In the present embodiment, the clamping assembly 1 is used in conjunction with a pivoting assembly 2 disposed above on the same side of the glass door A. The pivoting assembly 2 is pivotally connected to the door frame 4 disposed above such that the pivoting assembly 2 and the clamping assembly 1 pivot simultaneously according to the pivoting of the glass door A to open and/or close the glass door A.

Referring to FIG. 3 to FIG. 6 at the same time, the clamping assembly 1 according to one embodiment of the present invention includes an outer clamping body 10, an inner clamping body 20, an automatic homing mechanism 30, a positioning unit 40 and a cover 50.

Figure 3:
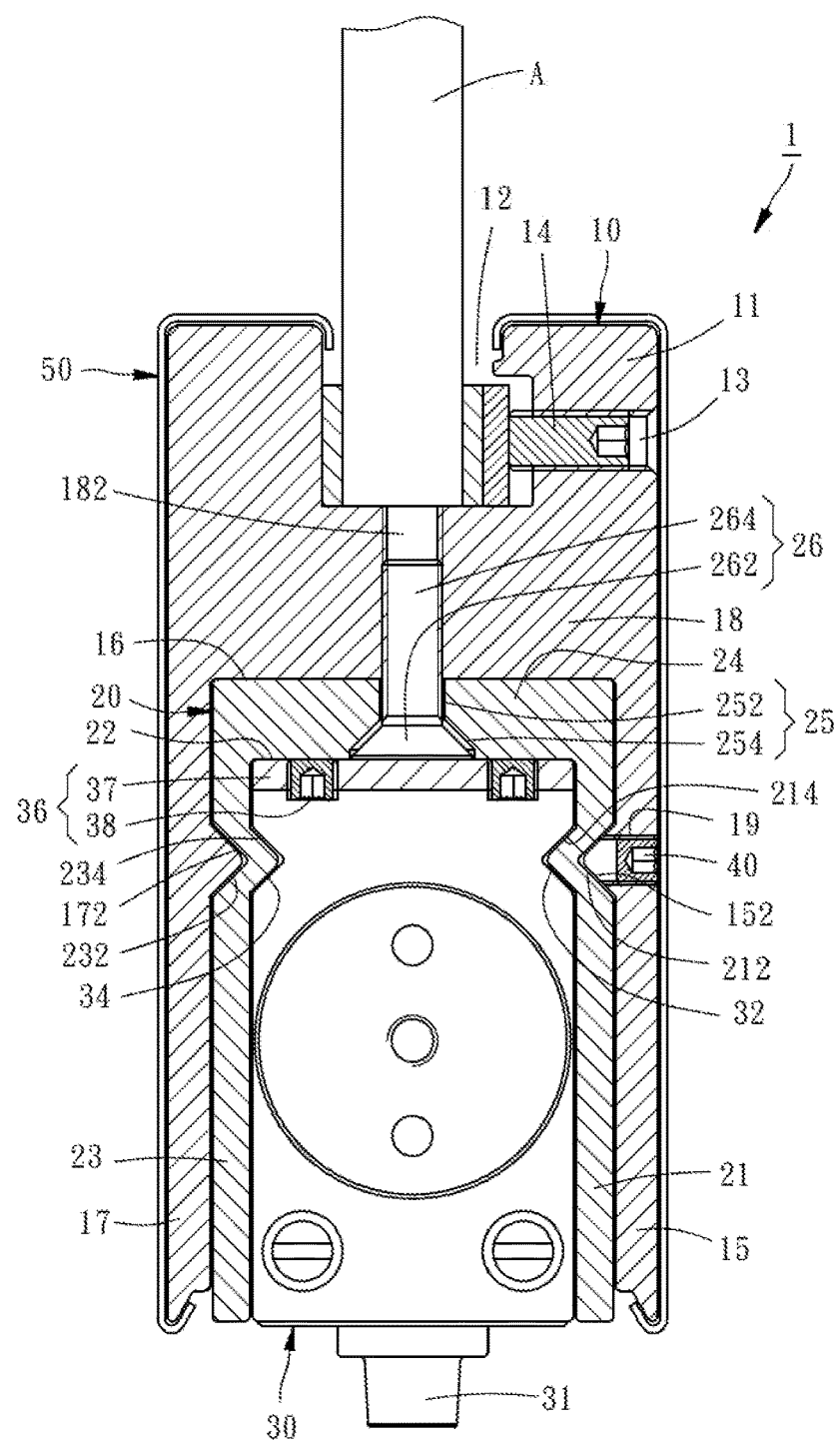
FIG. 3 is a schematic view showing a positional relationship between an outer clamping body, an inner clamping body, an automatic homing mechanism, and a positioning unit according to one embodiment of the present invention.
Figure 4:
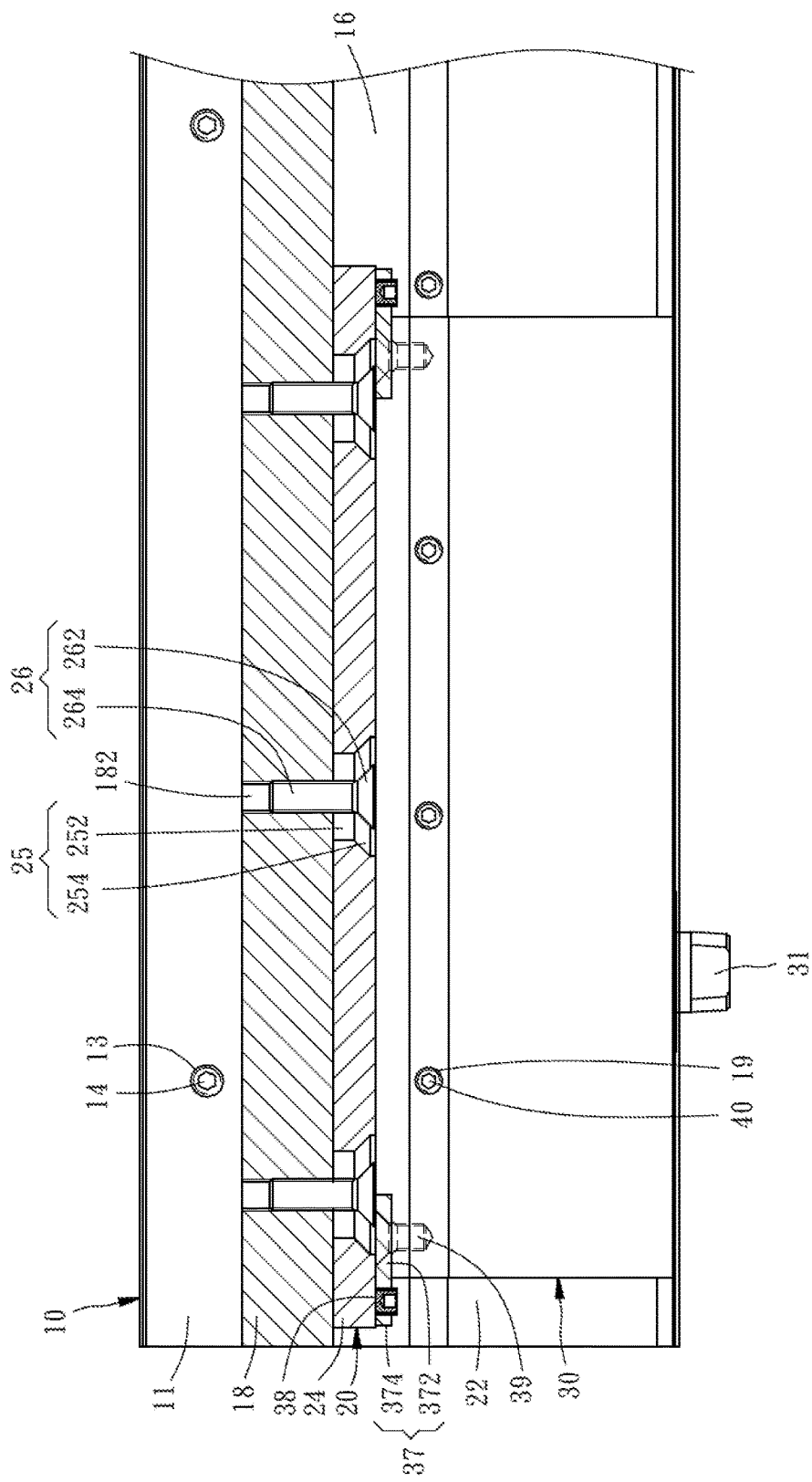
FIG. 4 is a schematic view showing a positional relationship between a fixing plate, a top abutting member, an inner clamping body, and an automatic homing device according to one embodiment of the present invention.
Figure 5:
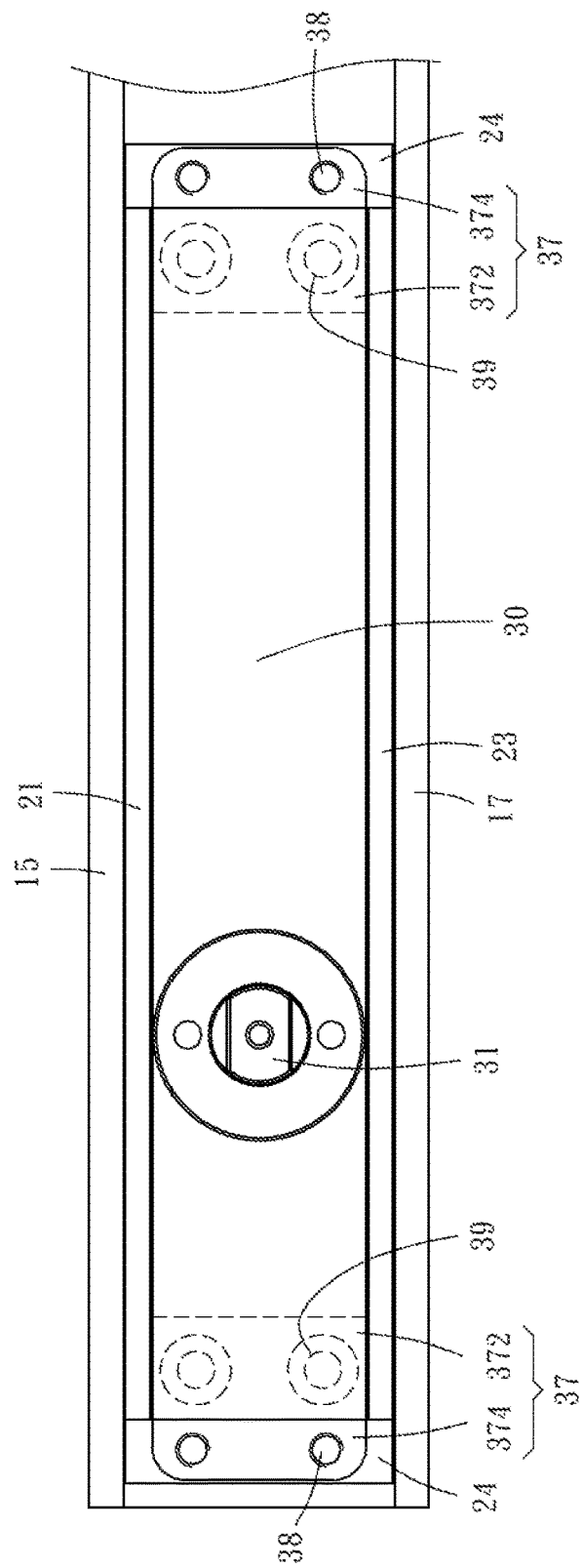
FIG. 5 is a bottom view showing a positional relationship between a fixing plate, a top abutting member and an automatic homing device according to one embodiment of the present invention.
Figure 6:
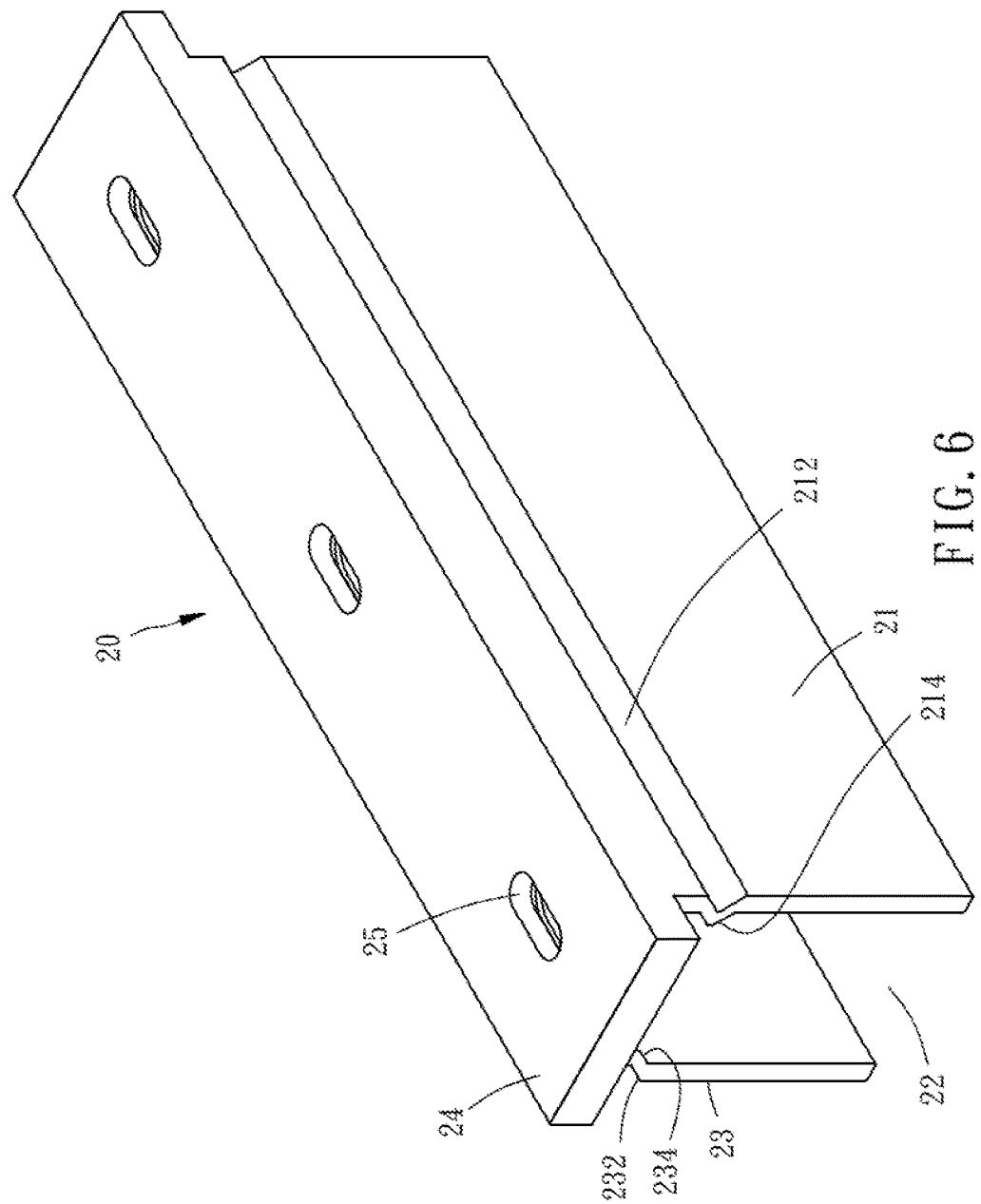
FIG. 6 is a perspective view of a top wall of an inner clamping body penetrating a long trough according to one embodiment of the present invention.

From FIG. 1 and FIG. 3, the cross-sectional view of the outer clamping body 10 is substantially "H" in shape as seen from left. An upper jaw 12 is recessedly provided on the top of the outer clamping body 10. Additionally, two clamping walls 11 are recessedly formed spaced apart from each other on the top of the outer clamping body 10 such that the upper jaw 12 is formed between the two clamping walls 11. The two clamping walls 11 are disposed in parallel to each other. The upper jaw 12 is used for clamping the glass door A. One of the clamping walls 11 transversely penetrates a first screw hole 13. A headless screw 14 is screwed to the first screw hole 13 and abuts against the glass door A such that the glass door A is fixedly positioned in the upper jaw 12. In the present embodiment, the purpose of using the headless screw 14 is to facilitate the appearance of the clamping assembly 1 to be flat such that the cover 50 as described later becomes easier to be assembled. A first lower jaw 16 is recessedly provided at the bottom of the outer clamping body 10. Furthermore, a first side wall 15 and a second side wall 17 are recessedly formed spaced apart from each other at the bottom of the outer clamping body 10. The outer clamping body 10 further includes a connection wall 18 connecting the first side wall 15 and the second side wall 17. A first lower jaw 16 is formed between the first side wall 15 and the second side wall 17. The connection wall 18 is disposed between the upper jaw 12 and the first lower jaw 16. The first side wall 15 and the second side wall 17 are disposed under the two clamping walls 11, respectively. The first side wall 15 and the second side wall 17 are parallel with each other such that the inner clamping body 20 can be slidably provided in the first lower jaw 16. A first bump 152 is provided transversely extending on an inner side of the first side wall 15. A third bump 172 is provided transversely extending on the inner side of the second side wall 17. The first bump 152 and the third bump 172 correspond to each other and are located at the same height. A second screw hole 19 transversely penetrates the first side wall 15 and the first bump 152. Furthermore, in the present embodiment, the number of second screw holes 19 is plural. The second screw holes 19 are arranged transversely and spaced apart with a constant spacing. The second screw holes 19 transversely penetrate the first side wall 15 and the first bump 152. However, in other embodiments, the number of second screw holes 19 is not limited. The number being one or more than one of second screw holes 19 should fall within the scope of the present invention. The connection wall 18 longitudinally penetrates a third screw hole 182. Furthermore, in the present embodiment, as shown in FIG. 2, and FIG. 4, the number of third screw holes 182 is plural. The third screw holes 182 are arranged transversely and spaced apart with a constant spacing. The third screw holes 182 longitudinally penetrate the connection wall 18. However, in other embodiments, the number of third screw holes 182 is not limited. The number being one or more than one of third screw holes 182 should fall within the scope of the present invention.

The inner clamping body 20 is disposed in the first lower jaw 16 of the outer clamping body 10. Referring to FIG. 1 and FIG. 3, the cross-sectional view of the inner clamping body 20 is substantially "Π" in shape as seen from left. A second lower jaw 22 is recessedly provided at the bottom of the inner clamping body 20. Furthermore, a third side wall 21 and a fourth side wall 23 are recessedly formed spaced apart from each other at the bottom of the inner clamping body 20. The inner clamping body 20 further includes a top wall 24 connecting the third side wall 21 and the fourth side wall 23. An outer side of the third side wall 21 and an outer side of the fourth side wall 23 abut against the inner side of the first side wall 15 and an inner side of the second side wall 17, respectively. A second lower jaw 22 is recessedly formed between the third side wall 21 and the fourth side wall 23. A first recess 212 is provided transversely extending on the outer side of the third side wall 21 corresponding to the first bump 152. A third recess 232 is provided transversely extending on the outer side of the fourth side wall 23 corresponding to the third bump 172 such that the first bump 152 and the third bump 172 can be slidably provided in the first recess 212 and the third recess 232 and that the inner clamping body 20 can be slidably provided in the first lower jaw 16. A second bump 214 is provided transversely extending on the inner side of the third side wall 21. The first recess 212 corresponds to the second bump 214. A fourth bump 234 is provided transversely extending on an inner side of the fourth side wall 23. The third recess 232 corresponds to the fourth bump 234. The top of the top wall 24 of the inner clamping body 20 abuts against the bottom of the connection wall 18 of the outer clamping body 10. The top wall 24 of the inner clamping body 20 longitudinally penetrates a long trough 25. The long trough 25 corresponds to the third screw hole 182 of the connection wall 18. The number of long troughs 25 is the same as the number of third screw holes 182. In other embodiments, the number of long troughs 25 and the number of third screw holes 182 can be single or plural. A fixing member 26 penetrates the long trough 25 and is separably fixed to the connection wall 18 of the outer clamping body 10 to position the inner clamping body 20 on the outer clamping body 10. Furthermore, the long trough 25 includes an accommodating area 252 and an expansion area 254 communicating with each other. The accommodating area 252 opens upwards. The expansion area 254 gradually expands from the inside out and opens downwards. The fixing member 26 is a screw including a head 262 and a thread portion 264 being connected with each other. The head 262 has a cone shape and is disposed in the expansion area 254 such that an outer edge of the head 262 abuts against the wall of the expansion area 254. The thread portion 264 penetrates the accommodating area 252 and is screwed to the third screw hole 182 on the connection wall 18 of the outer clamping body 10. When the thread portion 264 is driven into the third screw hole 182 at a certain depth, the head 262 abuts against the wall of the expansion area 254 in the long trough 25 such that the inner clamping body 20 is positioned in the first lower jaw 16 of the outer clamping body 10. Additionally, in FIG. 4, the length of the long trough 25 is larger than the outer diameter of the fixing member 26. When the user loosely releases the fixing member 26 to the third screw hole 182 such that the head 262 does not abut against the wall of the expansion area 254 in the long trough 25, the user can adjust the position of the inner clamping body 20 in the first lower jaw 16 of the outer clamping body 10.

The automatic homing mechanism 30 is detachably disposed in the second lower jaw 22 of the inner clamping body 20. The automatic homing mechanism 30 according to the present embodiment is a hydraulic hinge. The automatic homing mechanism 30 is substantially rectangular. The two sides of the automatic homing mechanism 30 are respectively abutted against the third side wall 21 and the fourth side wall 23 of the inner clamping body 20. On the two sides of the automatic homing mechanism 30 are respectively provided a transversely extending second recess 32 and a transversely extending fourth recess 34. The second recess 32 and the fourth recess 34 correspond to each other and are positioned at the same height. The second recess 32 and the fourth recess 34 respectively correspond to the second bump 214 on the inner side of the third side wall 21 and the fourth bump 234 on the inner side of the fourth side wall 23, such that the second bump 214 and the fourth bump 234 are respectively slidably provided in the second recess 32 and the fourth recess 34 and that the automatic homing mechanism 30 is slidably provided in the second lower jaw 22 of the inner clamping body 20. Referring to FIG. 3 to FIG. 4, in the present embodiment, the top of the automatic homing mechanism 30 is provided with two top abutting units 36. The two top abutting units 36 are respectively disposed on the two sides on the top of the automatic homing mechanism 30. Each of the top units 36 includes a fixing plate 37 and a top abutting member 38. The fixing plate 37 according to the present embodiment is fixed to the top of the automatic homing mechanism 30 by the screw 39. In other embodiments, the fixing plate 37 can also be connected to the top of the automatic homing mechanism 30 by welding or integral molding. The top abutting member 38 is disposed on the fixing plate 37 and abuts against the top wall 24 of the inner clamping body 20. Furthermore, referring to FIG. 5, the fixing plate 37 includes two side portions 372 and 374 connected to each other. One side portion 372 of the fixing plate 37 is fixed to the top of the automatic homing mechanism 30 by the screw 39. The other side portion 374 of the fixing plate 37 transversely protrudes from the top of the automatic homing mechanism 30. The top abutting member 38 is disposed on the side portion 374 of the fixing plate 37 on the top of the automatic homing mechanism 30. In the present embodiment, the top abutting member 38 is a headless screw. The top abutting member 38 is longitudinally screwed to the fixing plate 37 and abuts against the top wall 24 of the inner clamping body 20. Thereby, when locking the top abutting member 38 to abut against the top wall 24 of the inner clamping body 20, the automatic homing mechanism 30 can be positioned at the second lower jaw 22 of the inner clamping body 20. The position of the automatic homing mechanism 30 in the second lower jaw 22 of the inner clamping body 20 can be adjusted as long as the top abutting member 38 is loosely released. The automatic homing mechanism 30 can even be withdrawn from the second lower jaw 22 of the inner clamping body 20. It is worth mentioning that, in other embodiments, only one top abutting unit 36 provided on the top of the automatic homing mechanism 30 can also achieve the same function. Therefore, either one or two top abutting units 36 disposed on the top of the automatic homing mechanism 30 should fall within the scope of the present invention. In addition, the transmission shaft 31 of the automatic homing mechanism 30 protrudes downwards and is connected to the plate unit 3 on the floor 5. When the glass door A pivots and drives the automatic homing mechanism 30 to pivot, the transmission shaft 31 drives the hydraulic assembly inside the automatic homing mechanism 30 to provide an oil pressure to facilitate automatic homing of the glass door A.

Referring to FIG. 3, the positioning unit 40 transversely penetrates the first side wall 15 and the first bump 152, and abuts against the first recess 212 outside the third side wall 21. Furthermore, the positioning unit 40 is a headless screw. The positioning unit 40 is screwed to the second screw hole 19 and abuts against the first recess 212 outside the third side wall 21. Since the first recess 212 outside the third side wall 21 corresponds to the second bump 214 on the inner side of the third side wall 21 and the second recess 32 on one side of the automatic homing mechanism 30, the bonding strength between the automatic homing mechanism 30, the inner clamping body 20 and the outer clamping body 10 can be enhanced by locking the positioning unit 40 such that the automatic homing mechanism 30 and the inner clamping body 20 can be more fixedly positioned in the first lower jaw 16 of the outer clamping body 10. In addition, the purpose of using the headless screw as the positioning unit 40 is to facilitate the appearance of the outer clamping body 10 to be flat such that the cover 50 as described later becomes easier to be assembled.

The cover 50 is made of metal and is disposed on the outer edge of the outer clamping body 10 to cover the two clamping walls 11, the first side wall 15 and the second side wall 17 such that the overall clamping assembly 1 looks prettier and flatter. Additionally, the outer edge of the outer clamping body 10 can be protected from damage due to an impact by an external force.

Figure 7:
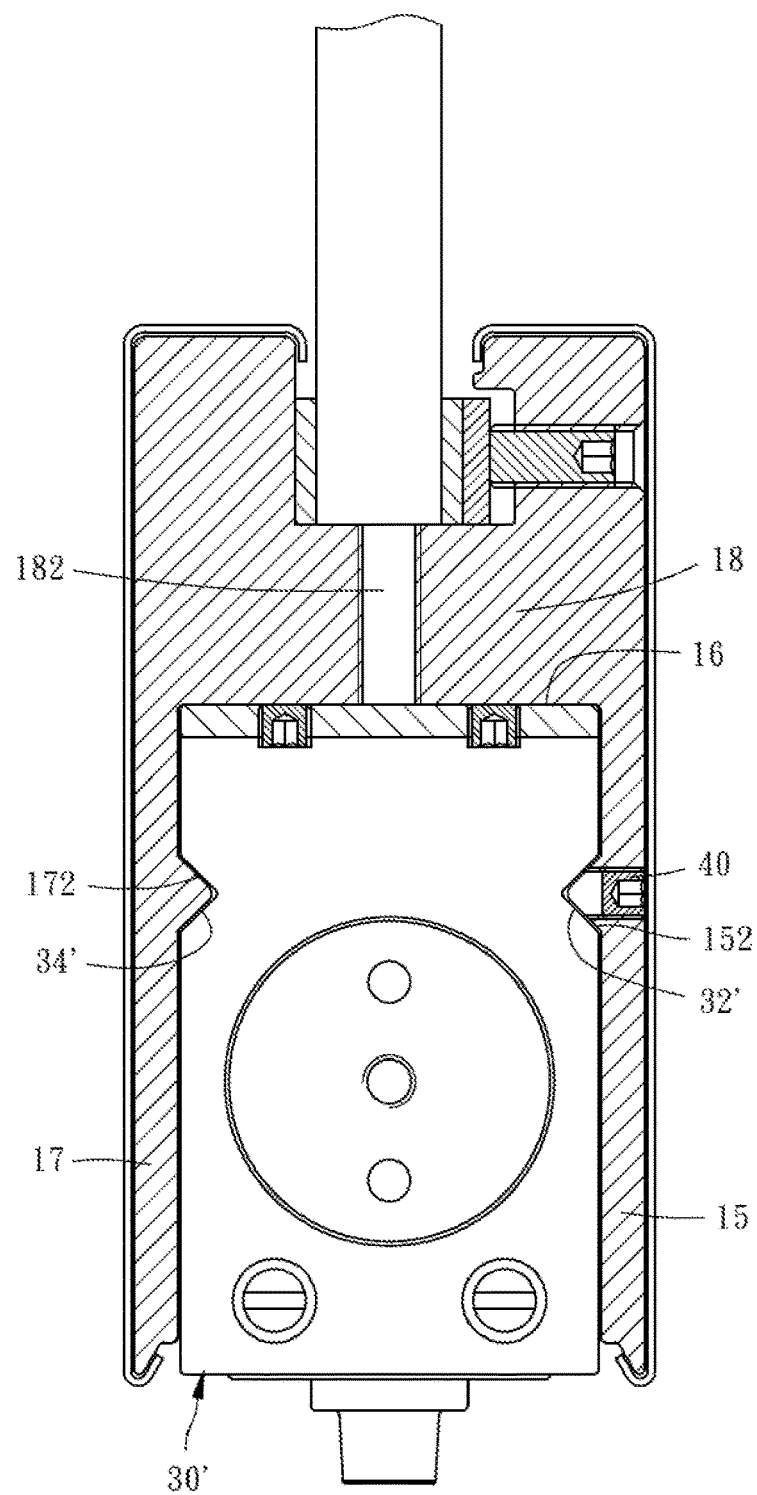
FIG. 7 is a schematic view of a larger automatic homing mechanism installed by removing an inner clamping body of a clamping assembly according to one embodiment of the present invention.

As stated above, referring to FIG. 3, when the inner clamping body 20 is disposed in the first lower jaw 16 of the outer clamping body 10, the automatic homing mechanism 30 with a smaller size can be installed on the second lower jaw 22 of the inner clamping body 20. Then, referring to FIG. 7, as long as the inner clamping body 20 is removed, an automatic homing mechanism 30' with a larger size can be installed on the first lower jaw 16 of the outer clamping body 10. It is worth mentioning that the larger automatic homing mechanism 30' is also provided with a second recess 32' and a fourth recess 34' transversely extending on both sides and thus can be positioned by the first bump 152, the positioning unit 40 and the third bump 172 in the first lower jaw 16 of the outer clamping body 10. Accordingly, the clamping assembly 1 according to the present invention is convenient and can reduce the production cost of the manufacturer to make it more economic.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation to encompass all such modifications and similar structures.

What is claimed is:

1. A clamping assembly for a glass door, comprising:
   an outer clamping body, wherein an upper jaw for clamping said glass door is recessedly provided on the top of said outer clamping body, a first side wall and a second side wall are recessedly formed spaced apart from each other at the bottom of said outer clamping body, a first lower jaw is formed between said first side wall and said second side wall, and a first bump is provided transversely extending on an inner side of said first side wall;
   an inner clamping body disposed in said first lower jaw of said outer clamping body, wherein a third side wall and a fourth side wall are recessedly formed spaced apart from each other at the bottom of said inner clamping body, an outer side of said third side wall and an outer side of said fourth side wall abut against said inner side of said first side wall and an inner side of said second side wall, a second lower jaw is recessedly formed between said third side wall and said fourth side wall, a first recess is provided transversely extending on said outer side of said third side wall corresponding to said first bump, a second bump is provided transversely extending on said inner side of said third side wall, and said first recess corresponds to said second bump;
   an automatic homing mechanism detachably disposed in said second lower jaw of said inner clamping body, wherein a second recess is provided transversely extending on one side of said automatic homing mechanism corresponding to said second bump; and
   a positioning unit transversely penetrating said first side wall and said first bump to abut against said first recess on said third side wall.

2. The clamping assembly according to claim 1, wherein a third bump is provided transversely extending on said inner side of said second side wall, a third recess is provided transversely extending on said outer side of said fourth side wall corresponding to said third bump, a fourth bump is provided transversely extending on an inner side of said fourth side wall, said third recess corresponds to said fourth bump, and a fourth recess is provided transversely extending on the other side of said automatic homing mechanism corresponding to said fourth bump.

3. The clamping assembly according to claim 1, wherein said inner clamping body further comprises a top wall connecting said third side wall and said fourth side wall, and a top abutting unit is provided on the top of said automatic homing mechanism and comprises a fixing plate fixedly connected to the top of said automatic homing mechanism and a top abutting member disposed on said fixing plate and abutting against said top wall of said inner clamping body.

4. The clamping assembly according to claim 3, wherein said outer clamping body further comprises a connection wall connecting said first side wall and said second side wall, said top wall of said inner clamping body abuts against said connection wall and longitudinally penetrates a long trough, and a fixing member penetrates said long trough and is separably fixed to said connection wall of said outer clamping body to position said inner clamping body on said outer clamping body.

5. The clamping assembly according to claim 4, wherein said long trough comprises an accommodating area and an expansion area communicating with each other, said accommodating area opens upwards, said expansion area gradually expands from the inside out and opens downwards, said fixing member is a screw comprising a head and a thread portion being connected with each other, said head is disposed in said expansion area, and said thread portion penetrates said accommodating area and is screwed to said connection wall of said outer clamping body.

6. The clamping assembly according to claim 3, wherein said top abutting member is a headless screw and longitudinally screwed to said fixing plate to abut against said top wall of said inner clamping body.

7. The clamping assembly according to claim 1, wherein said positioning unit is a headless screw.

8. The clamping assembly according to claim 1, further comprising a cover disposed on an outer edge of said outer clamping body.

* * * * *